3,512,913
DYEING POLYETHYLENE
TEREPHTHALATE FILM
Michael Curtis Day, Patrick Terence McGrail, and Basil R. Shephard, Manningtree, England, assignors to Bexford Limited, Essex, England, a British company
Filed July 18, 1966, Ser. No. 565,935
Claims priority, application Great Britain, July 26, 1965, 31,844/65
Int. Cl. D06p 3/34
U.S. Cl. 8—4    7 Claims

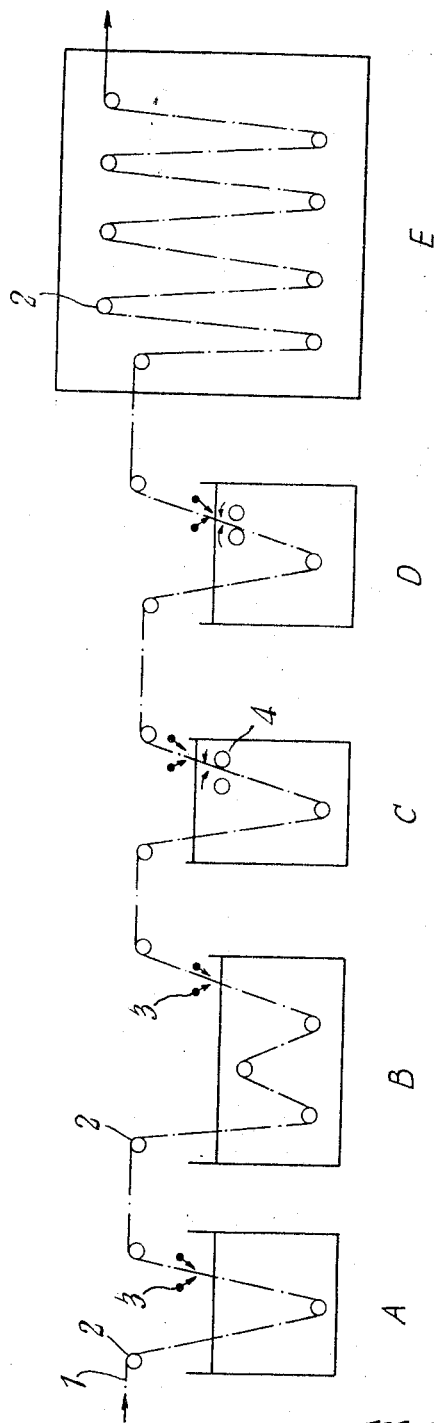

ABSTRACT OF THE DISCLOSURE

A process for the continuous dyeing of polyethylene terephthalate film which comprises the steps of applying to a traveling web of the film a pre-treatment liquid containing dye-carrier and then applying to the travelling web of film a hot aqueous dye-bath containing dye for the polyethylene terephthalate.

---

This invention relates to the dyeing of polyethylene terephthalate film by a continuous process. It is well known that polyethylene terephthalate, hereafter referred to as polyester, is difficult to dye owing to its closely knit and partly crystalline structure, its resistance to swelling in aqueous liquids and in many simple solvents, and its lack of chemical groupings having a strong affinity for dyestuffs.

However, acceptable industrial methods have been developed for the dyeing of polyester in fibre or fabric form and the most important method involves the use of disperse dyes. Dyes of this kind are insoluble in water but produce suspension of dye of very small particle size. They are available commercially as powders or as granules, usually already containing dispersing or stabilising agents in addition to dye.

Methods for the dyeing of polyester fabric are described in British Pat. No. 609,942 and involve, typically, the batch-wise dyeing of polyester fabric in aqueous dye suspensions at the boil for 30–90 minutes, usually in the presence of a dye-carrier, with high exhaustion of the dye-bath.

For the continuous dyeing of polyester in the form of film a very different process is required. Dyeing must occur at a very much faster rate and the amount of polyester at any one moment in the dye bath is small compared with the volume of liquor and so exhaustion does not occur. The dye-bath must not deposit any coagulated material during many days' heating, and the dyeing must be very even and free from blemishes, which are more visible on transparent film than on fabric.

The term polyester film as used in the specification refers to amorphous polyethylene terephthalate film and polyethylene terephthalate film which has been mono-axially stretched, or biaxially stretched and heat set to produce a dimensionally stable and stronger base.

One method of orientating polyethylene terephthalate film comprises stretching the film at 80–100° C. in a longitudinal direction with a draw ratio of 2.5–5.0 while the film is restrained from shrinkage in the other linear dimension followed by stretching the film at 80–120° C. in the transverse direction with a similar draw ratio while maintaining sufficient tension in the already drawn longitudinal direction to again avoid shrinkage. The film is finally heated at 150–250° C. for some 0.5–5 minutes while being restrained from shrinkage in both dimensions; the object of such heat-setting and similar annealing processes results in a film showing little or no shrinkage on reheating to moderate temperatures on a later occasion. As alternative process film may also be drawn transversely prior to longitudinally or may be biaxially drawn in both dimensions simultaneously. Also included within the term polyester film as used in the specification is a film of polyethylene terephthalate which has on its surface a coating of up to one micron in thickness, this coating being permeable to the dyes used in this invention. Such coatings are usually coated on to the amorphous polyethylene terephthalate film before the film is biaxially oriented or during a stage of the biaxial orientation. The purpose of such coatings on the film is to prepare the film for further coatings resulting finally in commercial products. Examples of such coatings are polyvinylidene chloride copolymers which contain not less than 30 mole percent of units derived from vinylidene chloride with one or more types of unit derived from ethylenically unsaturated copolymerisable monomers including vinyl-chloride, acrylonitrile, methacrylonitrile, itaconic acid, acrylic acid, methacrylic acid, acrylic esters or methacrylic esters. Polyvinylidene chloride homopolymers may also be coated in such a way and also any of the resins which constitute layer A of our co-pending British patent application 50,118/64. These are essentially polyvinyl halo-acetate or cyanoacetate polymers containing not less than 30 mole percent halo- or cyanoacetate together with one or more types of unit derived from vinyl alcohol, vinyl acetate, acrylamide, methacrylamide, crotonic acid, N-methylol acrylamide or 2-hydroxyethyl acrylate.

Hence polyethylene terephthalate film or polyester film as referred to in this specification relates to amorphous or monoaxially or biaxially oriented polyethylene terephthalate film and also to amorphous or monoaxially or biaxially oriented polyethylene terephthalate film which has on its surface a coating of up to one micron in thickness, this coating being permeable to the dyes used.

It is an object of the present invention to provide a process for the continuous dyeing of films or foils of polyester. It has now been found that by use of the apparatus and method herein described and preferably using certain dye-carriers, the continuous dyeing of polyester film may be effected at speeds of, for example, 10–100 ft./min. giving evenly dyed products.

Film dyed by the process of the present invention, for example in light shades having optical density to white light up to 0.5, is ideally suited as a plastics base for the subsequent preparation of photographic film for X-radiography, as a base for the preparation of drafing films and diazotype films, for the preparation of packaging films or for any other purpose where clear coloured polyester films may be used. Furthermore, during the process of dyeing, the surface characteristics of polyester film may be conveniently altered, if desired, so that the dyed film gives a stronger adhesive bond than undyed film to a layer of a polymeric material subsequently applied.

It is known to add dye-carriers to dye-baths used for the dyeing of polyester fibres or fabric and that these substances accelerate dyeing and enable dye-bath temperatures of, for example, 80–100° C. to be used with dyeing times of about 1–3 hours.

For the continuous dyeing of polyester film at economic speed the dye-bath must be maintained at 80–100° C. for many days. However, it has been found that the presence of dye-carrier has a destabilising effect on the dye-bath giving, within 1–24 hours of heating, deposition of tarry material on the walls of the equipment and on the surface of the polyester film. Instability of the dye-bath, even in the absence of carriers, occurs during long periods of heating at 80–100° C. but addition of surface active agents or stabilising agents, in addition to those already present in the dye-stuff introduced during the preparation of the dye in a dispersable condition, improves the dye-bath stability. Many surface active agents may be used and an amount of 10–100% by weight of the disperse dye used has been found most effective in baths not containing a dye-carrier while in baths containing a dye-carrier no sufficiently stable system was found.

It has now been found that instability in the dye-bath caused by the presence of dye-carrier may be avoided by applying dye-carrier to the film in a pre-treatment bath used before the film is passed into the dye-bath.

Accordingly therefore to the present invention there is provided a process for the continuous dyeing of polyethylene terephthalate film (as herein before defined) which comprises applying to a travelling web of the film a pre-treatment liquid containing dye-carrier and thereafter applying to the travelling web of the film a hot aqueous dye-bath containing a dispersed dye of a type suitable for the dyeing of polyethylene terephthalate.

The best results are obtained using the process of the present invention where the polyester film has been biaxially orientated and heat-set, and therefore it is preferred that the above defined process is applied to the dyeing of biaxially orientated, heat-set polyethylene terephthalate film.

It has been found that while it is well-known that the speed of dyeing of polyester film in a dye-bath, with or without dye-carrier present, is much accelerated by temperature so that for instance, baths containing dye-carrier are normally maintained at or near the boil, that application of dye-carrier in a pre-treatment bath may be made at any convenient temperature and the temperature of this first bath has little influence on the speed of dyeing in the subsequent hot dye-bath. Thus the pre-treatment bath containing dye-carrier may be at any temperature between freezing or boiling point but preferably is used at 15–80° C., e.g. 20–40° C.

A further advantage of the use of a pre-treatment bath maintained at, for example 20–40° C., is that there is little volatilisation of the dye-carrier (avoiding consequent loss and toxic hazard) compared with the conventional procedure of addition of the dye-carrier to the hot dye-bath.

A large number of dye-carriers have been proposed for the dyeing of polyester with disperse dyes. Well-known carriers are phenol, ortho- and para-phenylphenol, diphenyl, chlorinated benzenes and diphenyls, methyl salicylate, benzoic acid and benzyl alcohol. A number of dye-carriers described by trade names are also available for use as additions to the dye-bath from suppliers of disperse dyes.

In the present process dye-carriers may be applied as a pre-treatment to films of polyester in many ways including use of aqueous solutions, aqueous suspensions, aqueous mixtures containing the dye-carrier in a solubilised form, aqueous solutions of alkali metal, ammonium or amine carboxylates or phenates where appropriate or as solutions or suspensions in organic solvents. Some simple solvents such as the chlorinated hydrocarbon, for example methylene chloride, tetrachloroethane, chloroform or trichloroethylene, have noticeable swelling action on polyester and may also be used as dye-carriers.

While any dye-carrier may be employed in the present process as a pre-treatment, it has been found that aqueous solutions, either saturated or less than saturated, of ortho- or para-chlorophenol give simple, cheap and stable pre-treatment baths which are very effective in that a brief immersion of the film web, for example for 15 seconds, is sufficient to promote excellent dyeing in the subsequent hot-dye bath.

Employing aqueous solutions of ortho- or para-chlorophenol as a pre-treatment bath, followed by a hot dye-bath it has been found that the speed of dyeing is controlled by features relating to both baths.

Increase in the concentration of chlorophenol in the pre-treatment bath promotes faster dyeing in the subsequent dye-bath but the temperature of the pre-treatment bath and the time of immersion of the film web have only minor effect on the speed of dyeing.

Increase in the temperature of hot dye-bath and increase in the time of immersion of the film web in this bath and, to a slightly lesser extent, increase in the dye-content of the dye-bath all promote faster dyeing. The speed of dyeing is also influenced by the nature of the dye-stuff employed.

Polyester film dyed by the process of this invention may be further improved by cleaning and finishing treatments designed to achieve:

(i) Removal of traces and dispersing aids present on the surface of the film.
(ii) Increased penetration of the dye-stuff into the film to avoid extraction of dye caused by subsequent surface coatings applied using organic solvent solutions.
(iii) Modification of the surface of the dyed film making it more liable than untreated film to form a strong bond to adhesive or polymer coatings subsequently applied.

Treatments under (i) above may be to merely wash the film with water, preferably as soon as it emerges from the dye-bath, and dry the film. Or the film may be washed with solvents, preferably acetone or methanol, or washed with solvents after washing with water. Washing liquids may contain surface active agents, and mechanical aids such as rotating rollers, brushes or wipers, simple wipers or air-knives may be used if needed.

Treatments under (ii) are best applied after washing. Improved penetration is not always required since the dyed film resulting from the present process and treated as under (i) is free from surface dye. However, if the dyed film is treated with organic solvents for any further purpose, especially if the solvents have a penetrating action on polyester, dye is liable to be lifted to the surface or entirely removed from the film. Three methods have been found to give improved penetration of the dye and these may be combined in various ways for maximum effect:

(a) Increasing the time of immersion of the film in the pre-treatment bath of dye-carrier improves penetration of dye. A similar effect is given by increasing the temperature of the bath of dye-carrier, in so far as such increases are acceptable, by reason of the volatility of the carrier.
(b) Giving the film treatment with solvents having a slight swelling action on the film before treatment with dye-carrier, or immersing the dyed film from the dye-bath in the vapour of solvents having a swelling action. Suitable solvents are chlorinated hydrocarbons such as methylene chloride, trichlorethylene, chloroform or tetrachlorethane.
(c) Giving the dyed film heat-treatment at 80–200° C.

Treatments under (iii) are optional to improve adhesion in cases where coatings of polymeric materials are to be applied in further processes to the dyed film. Organic solvent solutions of swelling agents for polyester such as the mono- di- and tri-chlorophenols are supplied by passage of the dyed film through a solvent bath containing one or more swelling agents by bead coating or by any other well-known methods.

The film may be dyed with a mixture of dyes in one dye-bath although it is well known that as dyes are liable to have disparate propensity to transfer to the film the resultant colour tint of a continuously travelling web may gradually change. However, use of more than one dye, perhaps of similar colour, frequently faster dyeing or dyeing to a great depth of shade.

If it is required to dye the polyester film successively with two different dyes or with the same dye it is preferred that the film has applied to it a pre-treatment liquid containing dye-carrier and then a hot dye-bath containing one of the dispersed dyes followed by an aqueous washing and then the film has applied to it more pre-treatment liquid containing dye carrier and then has applied to it a second hot dye-bath containing the second dispersed dye.

The accompanying drawing will serve to illustrate the process of the invention.

In the accompanying drawing the direction of the polyester web 1 is indicated by arrows at the beginning and at the end of the web 1. The web 1 passes over a series of driven rollers 2 and follows a pre-determined path through the various treatment baths A, B, C and D. Treatment bath A is the dye assistant bath. Treatment bath B is the dye bath. Treatment bath C is the aqueous washing bath. Treatment bath D is the acetone washing bath and E is the drying cabinet, wherein the web is dried by hot air. After the web has passed through each of the baths A, B, C and D excess liquid is removed from either side of it by air blades 3. Situated in the baths C and D are rotating scrubbers 4 which serve to remove any residues of dyestuff which may still remain on the surface of the web.

The following examples will serve to illustrate the invention. In the examples reference is made to the apparatus illustrated in the accompanying drawing.

EXAMPLE 1

A polyester film was passed continuously through a bath A containing a 2.8% aqueous solution of para-chlorophenol held at 40° C. at a speed providing an immersion time of 12 seconds. As the film left the bath, excess solution was removed by air-knives and the surface-dried film was passed into the dye-bath B held at 85° C. and was given an immersion time of 30 seconds. The dye bath comprised an aqueous mixture of color Index Disperse Blue 26 63305 (0.2% w./v.) and dispersing agent (0.1% w./v.) Dye liquor on the surface of the film as it emerged from the dye bath was removed by air-knives as on Bath A. The film was washed in Bath C by contra-rotating rollers or brushes lightly scrubbing the dyed film under the surface of an aqueous solution of a surface active agent. After further air-knife treatment, the dyed film can optionally be washed in Bath D containing acetone, similarly fitted with contra-rotating scrubbers if residues of dye-stuff still remain on the surface. After a final air-knife treatment to remove acetone the dyed film was dried in Cabinet E for 5 minutes at 60° C. The blue film having an optical density to white light of 0.12 was perfectly evenly dyed and free from blemishes.

Although there is no appreciable loss of dye by immersion of the film in acetone or methanol, immersion of a piece of the film for 5 seconds in methylene chloride resulted in an 85% loss of dye. This test was applied as a guide to the extent of penetration of dye into the film.

EXAMPLE 2

Polyethylene terephthalate polyester was dyed as for Example 1, except that the heat-treatment in Cabinet E was 10 minutes at 110° C.

Immersion of the film for 5 seconds in methylene chloride caused a loss of 51% of the dye.

EXAMPLE 3

Polyethylene terephthalate film was dyed as for Example 1 except that the film was immersed for 40 seconds in the dye-carrier bath held at 40° C. and after dyeing acetone-washing was omitted.

The resultant dyed film showed a 49% loss of dye upon immersion in methylene chloride.

EXAMPLE 4

Polyethylene terephthalate film was dyed for Example 1, except that after washing with acetone the film was passed through the vapour of boiling methylene chloride for 30 seconds before passage into cabinet E.

Immersion of the dyed film in methylene chloride resulted in a 30% loss of dye.

EXAMPLE 5

Polyethylene terephthalate film was dyed as for Example 1, except that the carrier bath was maintained at 80° C. and the film was given a heat treatment of 4 minutes at 130° C. in Cabinet E.

Immersion of the dyed film in methylene chloride as a test procedure gave only 6% loss of dye.

EXAMPLE 6

Polyethylene terephthalate film was dyed as for Example 2 and after heat-treatment in Cabinet E, the film web was passed through a methanol solution containing 1% 2,4,6 trichlorophenol and 1% 2,4 dichlorophenol and the film was re-dried for 10 minutes at 60° C.

The blue film having an optical density to white light of 0.12 was perfectly evenly dyed and free from blemishes and was ideally suited for use as a base foil in the preparation of photographic film for X-radiography.

EXAMPLE 7

A freshly prepared latex of polyvinylidene chloride containing 10% solids was coated onto both sides of amorphous polyethylene terephthalate film. The coated film was heated at 90° C. and drawn in the longitudinal direction with a draw ratio of 1:3.5 while the edges were re-strained from shrinkage, followed by transverse drawing at 110° C. with a draw ratio of 1:3.5 while re-straining shrinkage in the longitudinal direction. The film was then heat-set for 3 minutes at 180° C. while further dimensional change was re-strained.

The coated, biaxially orientated film was dyed as in Example 1. The presence of the very thin coating had no effect on the speed of dyeing or on the final density of colour obtained.

EXAMPLE 8

Amorphous polyethylene terephthalate film was first stretched longitudinally as described in Example 7 and this uniaxially stretched film was then coated with a latex of polyvinyl chloracetate containing 3% solids. Processes of further stretching, heat-setting and dyeing were continued as in Examples 7 and 1. The very thin layer of polyvinyl chloracetate on the biaxially orientated polyethylene terephthalate film did not affect the dyeing which took place as for uncoated film.

EXAMPLE 9

Amorphous polyethylene terephthalate film was coated with a terpolymer latex derived from the monomers-vinylidene chloride, methyl acrylate and itaconic acid prepared as described in Example 1 of British Pat. 718,422. The coated film was biaxially stretched simultaneously in both linear dimensions at 100° C. with stretch ratios of 1:3.5 followed by heat-setting at 160° C. for 2 minutes.

The resultant film was dyed as in Example 1.

EXAMPLE 10

Polyvinyl alcohol was chloracetylated by heating with chloracetic acid until 70 mole percent of the alcohol groups were esterified.

An aqueous dispersion of the product was prepared containing 5% solids and 5% methyl salicylate.

The aqueous dispersion was used to coat both sides of amorphous polyethylene terephthalate film when processes of orientation, heat-setting and dyeing were carried out as in Examples 7 and 1.

EXAMPLE 11

Polyethylene terephthalate film biaxially orientated and heat-set was coated with a 0.5% solution of chloracetylated polyvinyl alcohol (90% esterified) in acetone. After drying the film was dyed blue as described in Example 1.

EXAMPLE 12

Polyethylene terephthalate film biaxially stretched and heat-set was passed continuously through a bath A containing a 2.5% aqueous solution of parachlorophenol at 25° C. at a speed providing an immersion time of 20 seconds. As the film left the bath, the excess solution was removed by air-knives and the surface-dried film was passed into a dye bath B held at 90° C. and was given an immersion time of 20 seconds. The dye-bath comprised an aqueous dispersion of CI Disperse Blue 59 (0.4% w./v.). The blue film from the bath was passed into a second bath of type A and then into a second dye-bath of type B but containing CI Disperse Orange 1, 11080 (0.4% w./v.) held at a temperature of 90° C. After an immersion in time in the second bath of 30 seconds the emergent orange-grey film was surface-dried by a pair of air-knives, passed into a bath of water to wash the film surface, redried by air-knives and finally heated for 3 minutes at 120° C. to accelerate diffusion to the dyes into the surface of the film.

EXAMPLE 13

Polyethylene terephthalate film was dyed as in Example 12 but treatment in a second dye-carrier bath A was omitted. Rather less of the orange dye was transferred to the film in the second dye bath B than occurred in Example 12 and the resultant product was grey in tint.

EXAMPLE 14

Polyethylene terephthalate film was dyed as in Example 12 using one dye-carrier bath A and one dye-bath B containing 0.4% w./v. of each of CI Disperse Blue 59 and CI Disperse Orange I, 11080. The film was dyed an even plain grey tint.

EXAMPLE 15

Polyethylene terephthalate film biaxially stretched and heat-set was dyed as in Example 1, but using a dye-bath containing 4% w./v. CI Disperse Red 92 and 93. The film was dyed pink.

EXAMPLE 16

Polyethylene terephthalate was dyed as in Example 1 using a dye-bath containing 0.4% w./v. CI Disperse Orange, 11080. The film was dyed a salmon-pink colour.

EXAMPLE 17

Polyethylene terephthalate was dyed as in Example 1 using a dye-bath containing 0.4% w./v. CI Disperse Yellow 3, 11855. The film was dyed a pale yellow colour.

EXAMPLE 18

Polyethylene terephthalate was dyed as in Example 1 using a dye-bath containing 0.4% w./v. CI Disperse Violet 25. The film was dyed light purple.

We claim as our invention:

1. A process for the continous dyeing of unplasticised polyethylene terephthalate film which comprises in sequence the steps of feeding a travelling web of said film through an aqueous bath containing dye carrier, the web being immersed in the said bath as it travels through it, substantially removing any bath liquor from the surface of the web, feeding the web through a hot aqueous bath containing a dispersed dye for the polyethylene terephthalate, the web being immersed in said dye bath as it travels through it, removing dye bath liquor from the surface of the web and drying the web.

2. A process according to claim 1 wherein the polyethylene terephthalate film has been biaxially orientated and heat-set.

3. A process according to claim 1 wherein the liquid containing dye-carrier is at a temperature of 15–80° C.

4. A process according to claim 1 wherein the dye-carrier is selected from the class consisting of phenol, ortho-para phenyl phenol, diphenyl, chlorinated benzenes, chlorinated diphenyls, methylsalicylates, benzoic acid and benzyl alcohol.

5. A process according to claim 1 wherein the liquid containing dye-carrier is an aqueous solution of para-chlorophenol.

6. A process according to claim 1 wherein the film subjected to said steps is a biaxially orientated and heat-set film, and the bath containing the dye-carrier is an aqueous solution of para-chlorophenol having a temperature of 15–80° C.

7. A process according to claim 1 wherein the dried, dyed web is heated to a temperature of 80–200° C.

References Cited

UNITED STATES PATENTS

| | | | |
|---|---|---|---|
| 2,188,160 | 1/1940 | Rooney et al. | 8—4 |
| 3,034,847 | 5/1962 | Chapman | 8—4 |

OTHER REFERENCES

H. U. Schmidlin: Preparation and Dyeing of Synthetic Fibers, April 1963, Publ. by Chapman & Hall Ltd., London, pp. 24–26, 33, 34, 254, 255, 291 and 292.

DONALD LEVY, Primary Examiner

T. J. HERBERT, Jr., Assistant Examiner

U.S. Cl. X.R.

8—92, 93, 94, 166, 173